US012462728B2

(12) United States Patent
Chen et al.

(10) Patent No.: US 12,462,728 B2
(45) Date of Patent: Nov. 4, 2025

(54) DISPLAY SYSTEM AND METHOD WITH ELECTROMAGNETIC SUSCEPTIBILITY

(71) Applicant: Himax Technologies Limited, Tainan (TW)

(72) Inventors: Peng-Chi Chen, Tainan (TW); Kun-Chih Lu, Tainan (TW); Shih-Yi Chang, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 18/387,233

(22) Filed: Nov. 6, 2023

(65) Prior Publication Data

US 2025/0148959 A1 May 8, 2025

(51) Int. Cl.
*G09G 3/20* (2006.01)
*G09G 3/36* (2006.01)

(52) U.S. Cl.
CPC ............. *G09G 3/2096* (2013.01); *G09G 3/36* (2013.01); *G09G 2320/02* (2013.01); *G09G 2320/0673* (2013.01); *G09G 2330/06* (2013.01)

(58) Field of Classification Search
None
See application file for complete search history.

(56) References Cited

U.S. PATENT DOCUMENTS 8,154,538 B2 * 4/2012 Ryu .................... H04L 25/0278 345/55
2017/0193900 A1 * 7/2017 Kwon .................. G09G 3/3275
2019/0197964 A1 * 6/2019 Cho .......................... G09G 3/20
2020/0097112 A1 * 3/2020 Seo ......................... G06F 3/044
2021/0020136 A1 * 1/2021 Zhao ........................ G09G 3/36
2021/0150968 A1 * 5/2021 Chen .................... G09G 3/3406
2021/0383770 A1 * 12/2021 Chen ...................... G09G 5/008
2022/0044652 A1 * 2/2022 Jeong ..................... G09G 5/008
2022/0198989 A1 * 6/2022 Park ....................... G09G 5/008
2023/0206885 A1 * 6/2023 Kwon .................... G09G 5/008 345/530

* cited by examiner

*Primary Examiner* — Andre L Matthews
(74) *Attorney, Agent, or Firm* — Donald E. Stout; Stout, Uxa & Buyan, LLP

(57) ABSTRACT

A display system with electromagnetic susceptibility includes a programmable gamma circuit capable of being adjusted dynamically to supply a programmable gamma voltage curve that provides gamma voltage; a timing controller that receives image data and converts format of the received image data, thereby generating data signal; and a source driver that receives the data signal from the timing controller and the gamma voltage from the programmable gamma circuit. The source driver sends a notification signal to the timing controller indicating that the data signal is not properly received, and the timing controller then programs the programmable gamma circuit to provide an offset voltage level to binding points of the programmable gamma circuit for a predetermined time period.

12 Claims, 4 Drawing Sheets

DISPLAY SYSTEM AND METHOD WITH ELECTROMAGNETIC SUSCEPTIBILITY

BACKGROUND OF THE INVENTION

1. Field of the Invention

The present invention generally relates to a display system, and more particularly to a display system and method with electromagnetic susceptibility (EMS).

2. Description of Related Art

A portable computer such as laptop computer or notebook computer is a small, portable personal computer (PC). Portable computers typically have a flat panel screen (e.g., liquid-crystal display (LCD) panel) on the inside of the upper lid and an alphanumeric keyboard and pointing device (such as a trackpad and/or trackpoint) on the inside of the lower lid.

Electromagnetic interference (EMI) is unwanted noise or interference in an electrical path or circuit caused by an outside source such as a mobile phone. It can cause electronics to operate poorly, malfunction or stop working completely. Portable computers are not immune to EMI and can be affected by it.

Water ripple phenomenon and V-band effect are caused by EMI on the gamma voltage (as a reference voltage) for the LCD panel, thereby affecting gray scale display and color white balance of the LCD panel.

A need has arisen to propose a novel scheme for resisting EMI, particularly to prevent or mitigate (water) ripple phenomenon or V-band effect caused by EMI.

SUMMARY OF THE INVENTION

In view of the foregoing, it is an object of the embodiment of the present invention to provide a display system and method with electromagnetic susceptibility (EMS) capable of functioning properly in the presence of electromagnetic interference (EMI) and effectively preventing or mitigating (water) ripple phenomenon or V-band effect caused by EMI.

According to one embodiment, a display system with electromagnetic susceptibility includes a programmable gamma circuit, a timing controller and a source driver. The programmable gamma circuit is capable of being adjusted dynamically to supply a programmable gamma voltage curve that provides gamma voltage. The timing controller receives image data and converts format of the received image data, thereby generating data signal. The source driver receives the data signal from the timing controller and the gamma voltage from the programmable gamma circuit. The source driver sends a notification signal to the timing controller indicating that the data signal is not properly received, and the timing controller then programs the programmable gamma circuit to provide an offset voltage level to binding points of the programmable gamma circuit for a predetermined time period.

According to another embodiment, a display method with electromagnetic susceptibility includes the following steps: determining whether electromagnetic interference (EMI) is present; a source driver sending a notification signal to a timing controller if the EMI is present; and the timing controller programming a programmable gamma circuit to provide an offset voltage level to binding points of the programmable gamma circuit for a predetermined time period in response to the notification signal.

DETAILED DESCRIPTION OF THE INVENTION

Figure 1:
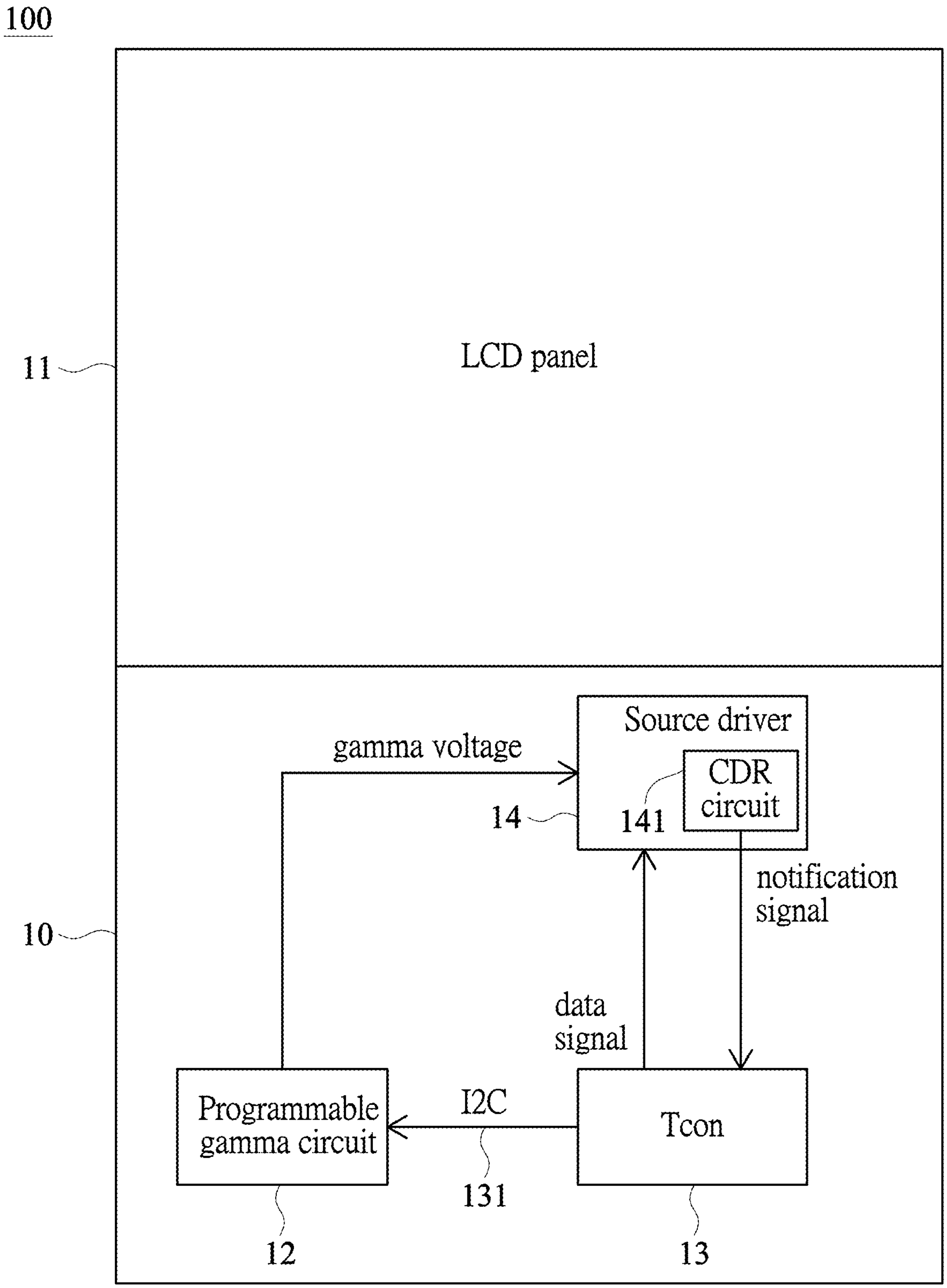
FIG. 1 shows a block diagram illustrating a display system with electromagnetic susceptibility (EMS) adaptable to a computer according to one embodiment of the present invention.
Figure 2:
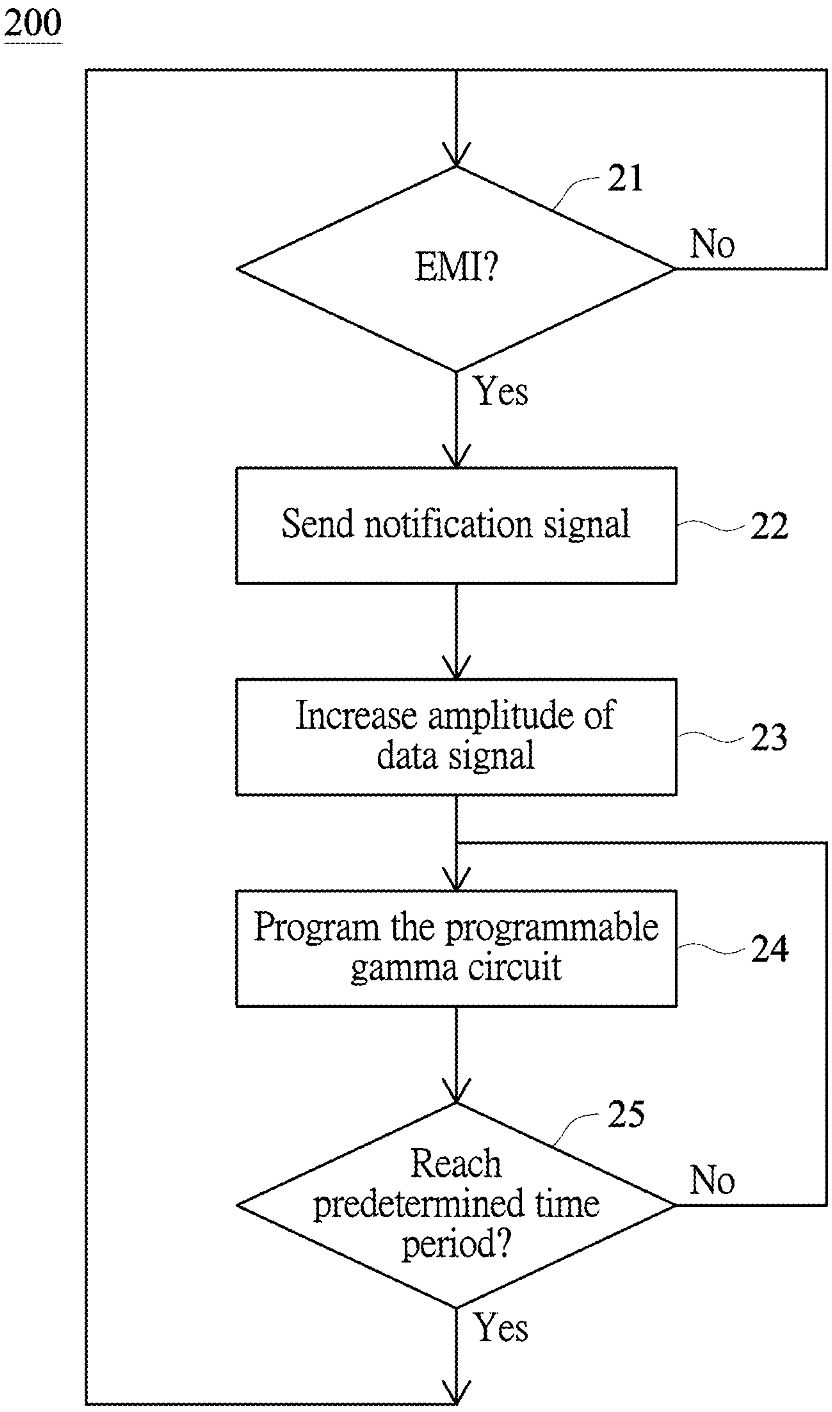
FIG. 2 shows a flow diagram illustrating a display method with EMS adaptable to the display system 100 of FIG. 1.

FIG. 1 shows a block diagram illustrating a display system 100 with electromagnetic susceptibility (EMS) adaptable to a computer such as a portable computer (e.g., notebook or laptop computer) according to one embodiment of the present invention, and FIG. 2 shows a flow diagram illustrating a display method 200 with EMS adaptable to the display system 100 of FIG. 1 capable of functioning properly in the presence of electromagnetic interference (EMI), which is disturbance affecting the display system 100 due to either electromagnetic induction or electromagnetic radiation emitted from an external source such as a mobile phone. Particularly, the display method 200 of the embodiment can effectively prevent or mitigate (water) ripple phenomenon or V-band effect caused by EMI, for example, of the mobile phone.

In the embodiment, the display system 100 may include a liquid-crystal display (LCD) panel 11 composed of liquid crystals that may be electronically modulated to pass or block light. The display system 100 may include a programmable gamma circuit 12 (e.g., an integrated circuit) disposed on a substrate 10 (e.g., printed circuit board or PCB) and configured to supply a programmable gamma voltage curve that provides gamma voltage (as a reference voltage), thereby affecting gray scale display and color white balance of the LCD panel 11. The gamma voltage curve is not a linear curve because human eye's perception of light is not linear. The programmable gamma circuit 12 of the embodiment supplies a gamma voltage curve with grayscale capable of being adjusted dynamically to make the display screen of the LCD panel 11 more in line with human eye's perception of light.

The portable computer 100 of the embodiment may include a timing controller (Tcon) 13, for example, an integrated circuit, disposed on the substrate 10 (e.g., PCB) and configured to receive image data and to convert format of the received image data, thereby generating (image) data signal. The timing controller 13 of the embodiment may include a communication interface 131, such as a serial communication interface (e.g., inter-integrated circuit or I2C interface) adaptable to programming the programmable gamma circuit 12.

The portable computer 100 of the embodiment may include a source driver (SD) 14 disposed on the substrate 10 (e.g., PCB) and configured to receive the data signal (from the timing controller 13) which is then displayed on the LCD panel 11 and to receive the gamma voltage (from the programmable gamma circuit 12).

Referring to FIG. 2, in step 21, it is determined whether electromagnetic interference (EMI) is present. Specifically, when the source driver 14 fails to receive stable data signal (e.g., data signal with proper amplitude) from the timing controller 13, it assumes that EMI is present.

If it is determined that EMI is present, the source driver 14 then sends a notification (or feedback) signal (to the timing controller 13) indicating that the data signal is not properly received (step 22); otherwise the flow goes back to step 21. In one embodiment, the source driver 14 may include a clock and data recovery (CDR) circuit 141 configured to generate the notification signal. It is noted that the EMI may also cause an unlock phenomenon between the timing controller 13 and the source driver 14.

Figure 3A:
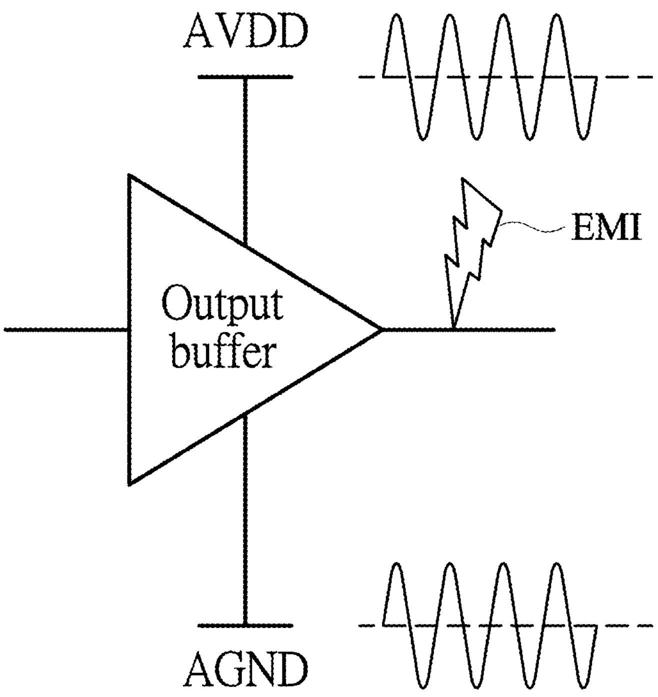
FIG. 3A shows a partial circuit of the programmable gamma circuit demonstrating that the ground AGND (and the power AVDD) are affected by the EMI.
Figure 3B:
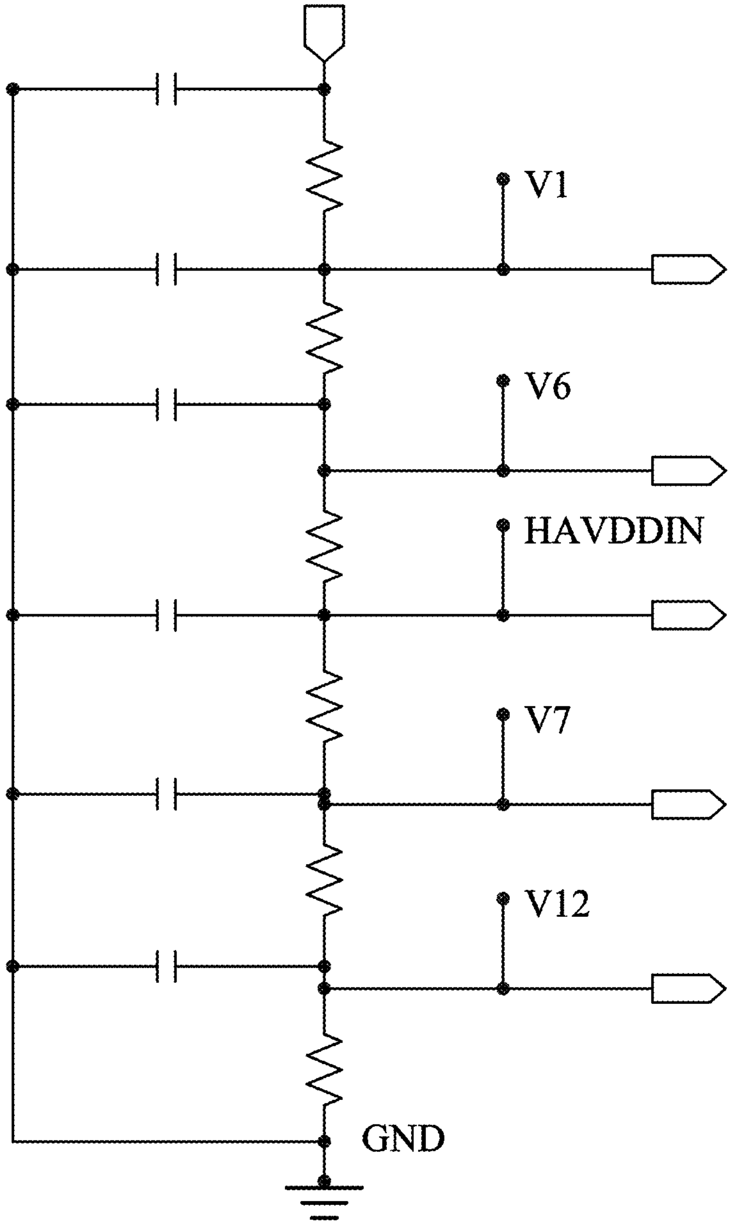
FIG. 3B shows a simplified circuit illustrating the programmable gamma circuit with some binding points.

FIG. 3A shows a partial circuit of the programmable gamma circuit 12 demonstrating that the ground AGND (and the power AVDD) are affected by the EMI. FIG. 3B shows a simplified circuit illustrating the programmable gamma circuit 12 with some binding points. It is noted that the ground GND affected by the EMI may also affect the gamma voltages at the binding points such as V12, V7, HAVDDIN, V6 and V1 as exemplified in FIG. 3B. Therefore, the gamma voltage at the binding point near the ground GND cannot be distinguished, thereby resulting in (water) ripple phenomenon or V-band effect.

Subsequently, in step 23, in response to the notification signal, the timing controller 13 increases amplitude of the data signal, which is then resent to the source driver 14. According to one aspect of the embodiment, in step 24, the timing controller 13 programs the programmable gamma circuit 12 via the communication interface 131 (e.g., I2C). Specifically, the timing controller 13 outputs a code to the programmable gamma circuit 12 via the communication interface 131, thereby providing an offset voltage level (e.g., 1 volt) to the binding points of the programmable gamma circuit 12 (e.g., V12, V7, HAVDDIN, V6 and V1 as exemplified in FIG. 3B).

In step 25, an (internal) counter (of the timing controller 13) counts until the counter reaches a predetermined time period (e.g., in a range of 30 seconds to 1 minutes), at that time the flow goes back to step 21 for normal operation.

According to the embodiment as described above, particular the execution of step 24, (water) ripple phenomenon or V-band effect caused by EMI can be effectively prevented or mitigated.

Although specific embodiments have been illustrated and described, it will be appreciated by those skilled in the art that various modifications may be made without departing from the scope of the present invention, which is intended to be limited solely by the appended claims.

What is claimed is:

1. A display system with electromagnetic susceptibility, comprising:

a programmable gamma circuit capable of being adjusted dynamically to supply a programmable gamma voltage curve that provides gamma voltage;

a timing controller that receives image data and converts format of the received image data, thereby generating data signal; and a source driver that receives the data signal from the timing controller and the gamma voltage from the programmable gamma circuit;

wherein the source driver sends a notification signal to the timing controller indicating that the data signal is not properly received, and the timing controller then programs the programmable gamma circuit to provide an offset voltage level to binding points of the programmable gamma circuit for a predetermined time period when the data signal is not properly received;

wherein the source driver comprises a clock and data recovery (CDR) circuit that generates the notification signal;

wherein a counter is used to count until the counter reaches the predetermined time period.

2. The system of claim 1, further comprising:

a liquid-crystal display (LCD) panel, on which the data signal received by the source driver is displayed.

3. The system of claim 1, wherein the timing controller comprises a communication interface adaptable to programming the programmable gamma circuit.

4. The system of claim 3, wherein the communication interface comprises an inter-integrated circuit (I2C) interface.

5. The system of claim 1, further comprising:

a substrate on which the programmable gamma circuit, the timing controller and the source driver are disposed.

6. The system of claim 5, wherein the substrate comprises a printed circuit board.

7. The system of claim 1, wherein it is determined that electromagnetic interference (EMI) is present when the source driver fails to receive stable data signal from the timing controller.

8. The system of claim 1, wherein the timing controller increases amplitude of the data signal, which is then resent to the source driver, in response to the notification signal.

9. A display method with electromagnetic susceptibility, comprising:

determining whether electromagnetic interference (EMI) is present;

a source driver sending a notification signal to a timing controller if the EMI is present; and the timing controller programming a programmable gamma circuit to provide an offset voltage level to binding points of the programmable gamma circuit for a predetermined time period in response to the notification signal when the EMI is present;

wherein the source driver comprises a clock and data recovery (CDR) circuit that generates the notification signal;

wherein a counter is used to count until the counter reaches the predetermined time period.

10. The method of claim 9, wherein the source driver fails to receive stable data signal from the timing controller when the EMI is present.

11. The method of claim 9, further comprising:

the timing controller increasing amplitude of the data signal, which is then resent to the source driver, in response to the notification signal.

12. The method of claim 9, wherein the timing controller programs the programmable gamma circuit via a communication interface.

* * * * *